United States Patent [19]

Leisinger

[11] Patent Number: 5,148,881
[45] Date of Patent: Sep. 22, 1992

[54] ELECTRONIC WEIGHTING APPARATUS WITH CALIBRATION WEIGHT ARRANGEMENT

[75] Inventor: Roger Leisinger, Zürich, Switzerland

[73] Assignee: Mettler - Toledo AG, Greifensee, Switzerland

[21] Appl. No.: 726,798

[22] Filed: Jul. 8, 1991

[30] Foreign Application Priority Data

Jul. 27, 1990 [CH] Switzerland .................. 2495/90

[51] Int. Cl.⁵ ................. G01G 19/52; G01G 3/08; G01L 25/00
[52] U.S. Cl. ..................... 177/50; 177/229; 73/1 B
[58] Field of Search ............. 177/50, 229; 73/1 B

[56] References Cited

U.S. PATENT DOCUMENTS

| | | | |
|---|---|---|---|
| 3,738,439 | 6/1973 | Herbert | 177/50 |
| 4,425,975 | 1/1984 | Luechinger | 177/50 |
| 4,566,548 | 1/1986 | Sodler et al. | 177/229 |
| 4,766,965 | 8/1988 | Luchinger | 177/50 |
| 4,932,487 | 6/1990 | Melcher et al. | 177/50 |
| 4,977,969 | 12/1990 | Leisinger et al. | 177/50 |

Primary Examiner—George H. Miller, Jr.
Attorney, Agent, or Firm—Laubscher & Laubscher

[57] ABSTRACT

Electronic weighing apparatus includes a main scale housing (1) within which is arranged a calibration weight housing (33, 133) containing a calibration weight (75, 175) operable between weight-applying and weight-removed conditions relative to horizontal projections (79, 179) that extend from load receiver (15) through wall openings (81, 181) into the calibration weight housing. The calibration weight is operable by a carrier member (57, 157) that is vertically movable by means of a pair of horizontally spaced wedge-shaped lifting members (39, 139) that are displaced toward and away from each other, respectively, by a spindle (41) having threaded portions (43a, 43b) of opposite pitch, which spindle is driven by a reversible motor (53).

13 Claims, 2 Drawing Sheets

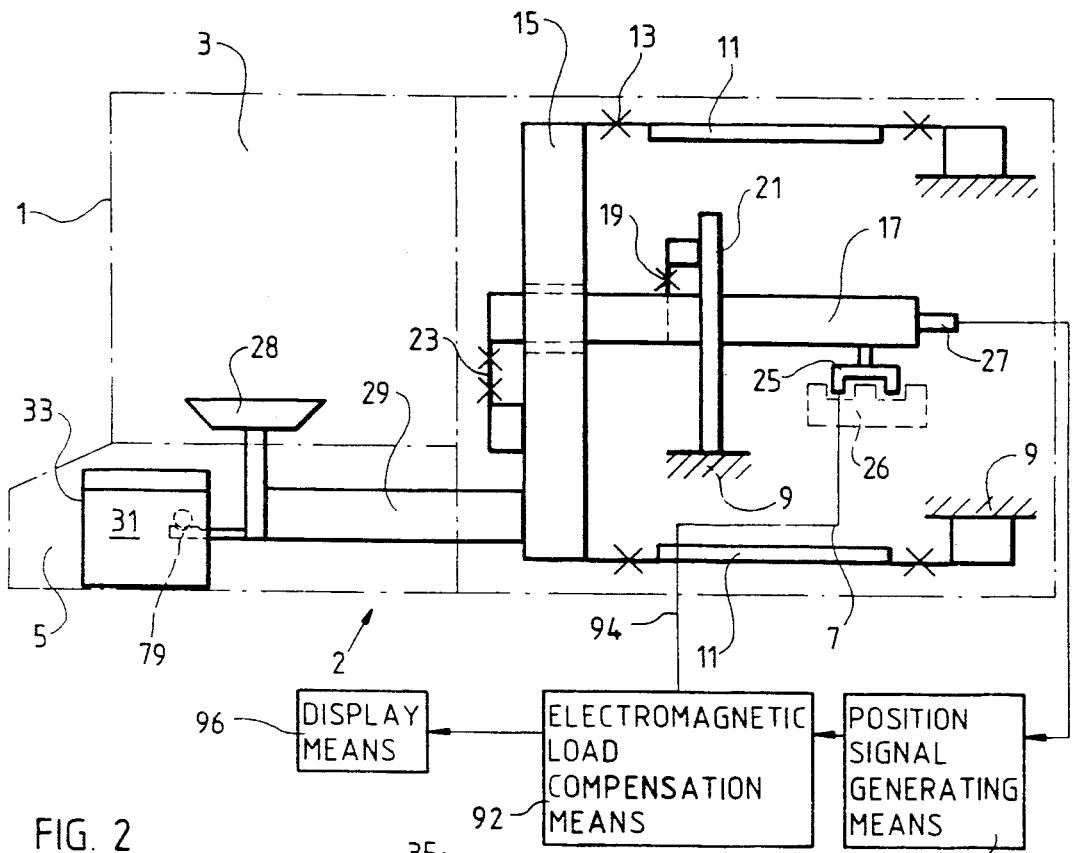
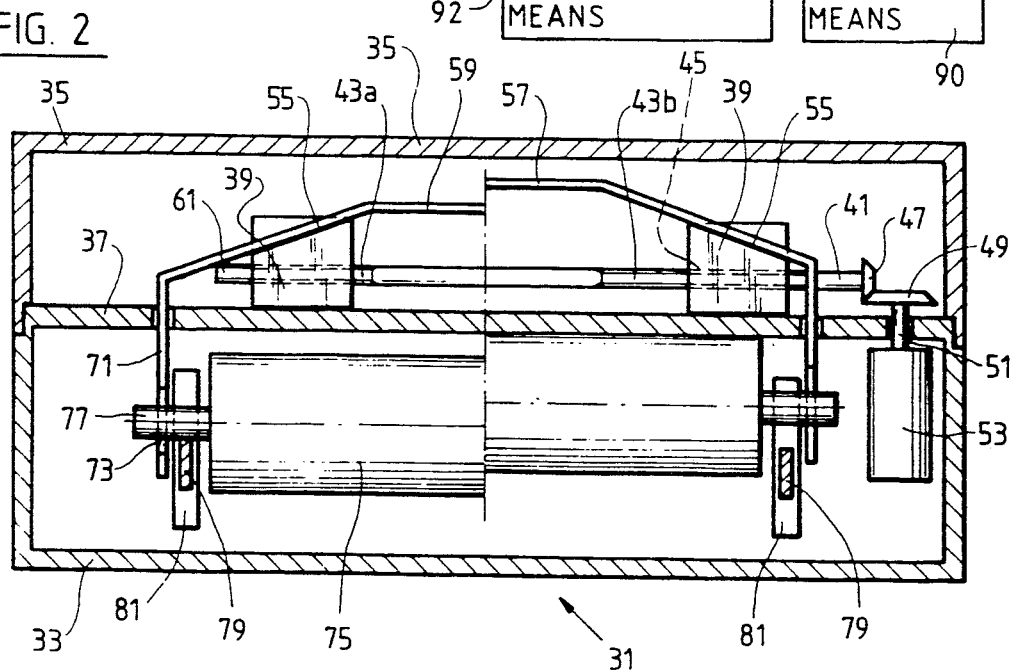

ELECTRONIC WEIGHTING APPARATUS WITH CALIBRATION WEIGHT ARRANGEMENT

STATEMENT OF THE INVENTION

This invention relates to an electronic weighing apparatus having a calibration weight arrangement for selectively applying a calibration weight to the load receiver, including a calibration weight carrier, and spindle-operated wedge means for vertically displacing the carrier to apply the calibration weight to, and to remove the calibration weight from, the load receiver, respectively.

BRIEF DESCRIPTION OF THE PRIOR ART

In high-resolution electronic scales, it is necessary from time to time to make a comparison between a reference or calibration weight and the indicated weight that is calculated by the scale on the basis of a measurement signal. Here, it is customary to place a known reference weight on the weighing pan carrier and to make a comparison. Mechanisms for placing a reference weight are known from the prior art, as evidenced by the U.S. Pat. No. to Leisinger et al 4,977,969, and Luchinger U.S. Pat. No. 4,425,975. Luchinger discloses a mechanism for the placement of a U-shaped calibration weight—whose shank portions grip the weighing pan carrier on both sides—that rests upon a unilaterally fastened calibration weight carrier that is made of spring steel. The calibration weight carrier is firmly connected at its lower end with the scale frame, the free end of the carrier being raised or lowered by means of a wedge that can be shifted with the help of a lever-actuated pin. When in the raised position, the calibration weight is not engaged with the weighing pan carrier. If the wedge is retracted, the calibration weight comes to rest upon supports attached to the weighing pan carrier, whereby when the calibration weight carrier is lowered further, the calibration weight rests freely upon the weighing pan carrier. With the help of this known device, the calibration weight can be deposited and lifted off again for the purpose of calibration in a simple manner.

SUMMARY OF THE INVENTION

A primary object of the present invention is to provide a calibration weight arrangement that is suitable for use as an independent attachment to various types of weighing scales. To this end, the calibration weight arrangement includes a carrier member that is vertically movable by means of a pair of horizontally spaced wedge members that are displaced toward and away from each other by a reversible-motor-driven spindle having a pair of threaded portions of opposite pitch. Owing to the placement of the wedge members in mirror-image symmetry, it is possible, on the calibration weight carrier, exactly to position the calibration weight on the load receiver, on the one hand, for calibration, and, on the other hand, during non-use, and especially during the transportation of the scale, to hold it securely.

According to another object, the calibration weight arrangement is made as an autonomous unit, contained in a housing, and it can be installed in weighing scales of different types and sizes. The U-shaped design of the calibration weight carrier makes it possible to produce it at reasonable cost and provides a secure mounting of the calibration weight by means of suitable V-shaped or arc-shaped recesses. Depending on the height of the space available for installation, the calibration weight carrier contains leg portions that extend either upwardly or downwardly. Slotted recesses in the calibration weight carrier permit direct longitudinal guidance of the wedge lifting elements on its base leg and economical production techniques, since little in the way of manufacturing steps are required for the processing tolerance of the housing that will receive the arrangement. By using the bottom of the housing as a sliding surface for the lifting elements, one needs less parts and, consequently, less assembly time.

BRIEF DESCRIPTION OF THE DRAWINGS

Other objects and advantages of the invention will become apparent from a study of the following specification when viewed in the light of the accompanying drawing, in which;

FIG. 1 is a diagrammatic view of the electronic weighing apparatus including the calibration weight means of the present invention;

FIG. 2 is a sectional view of the calibration weight applying means;

DETAILED DESCRIPTION

Figure 3:
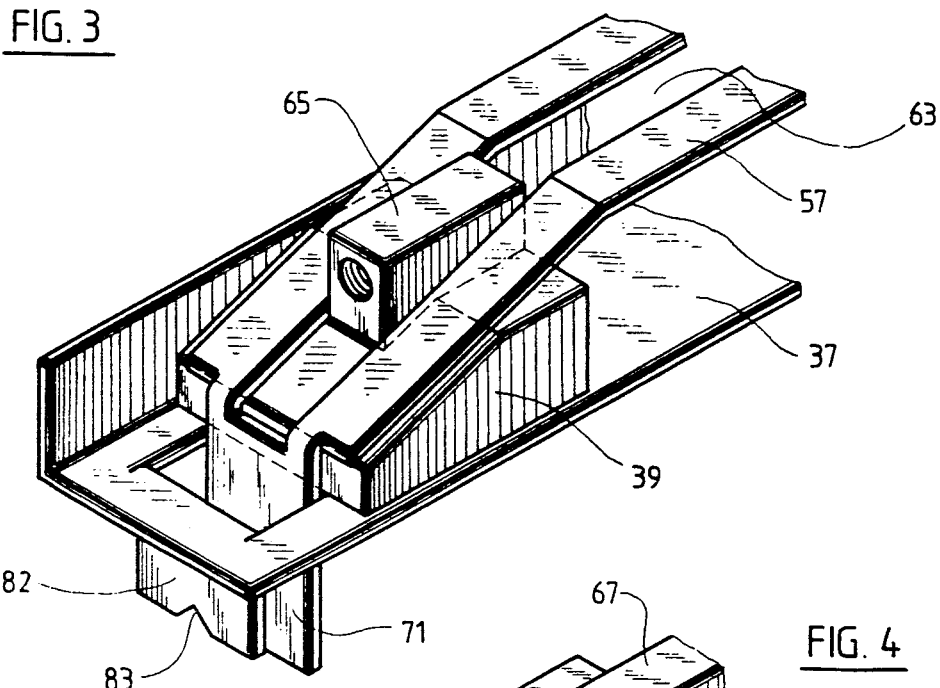
FIG. 3 is a detailed perspective view of the wedge lifting means of FIG. 2.

Referring first more particularly to FIG. 1, the electronic weighing apparatus includes a main housing 1 containing a weighing chamber 3 and provided with a keyboard 5, as is conventional in the art. Mounted for movement within the weighing chamber 3 is a weighing pan 28 that is connected by horizontal arm 29 with the load receiving member 15. The load receiving member 15 is guided for vertical movement relative to the frame 9 of the main housing 1 by parallel guide means 11 having flexure bearing means 13, as is known in the art. Transmission lever 17 is pivotally supported by flexure bearing means 19 from the fixed pedestal 21 that is secured to the frame 9. At one end, the transmission lever 17 is connected by flexure bearing means 23 with the load receiver 15, and at its other end, the transmission lever 17 carries the conventional coil 25 of an electromagnetic load compensation system. The coil 25 is arranged within the magnetic field produced by a stationary permanent magnet 26, and the movement of the transmission lever 17 relative to the frame 9 is detected by photoelectric means 27 that supplies a signal to the position signal generating means 90. As is known in the art, the position signal generating means 90 supplies an input to the electro-magnetic load compensation means 92 that supplies load compensating current to the coil 25 via conductor 94. The load applied to the weighing pan 28—which corresponds to the electromagnetic compensation current supplied via conductor 94—is displayed on the display means 96.

In accordance with a characterizing feature of the present invention, there is mounted within the housing 1 a calibration weight housing 33 which contains the calibration weight means 31. As will be described in greater detail below, the calibration weight means 31 includes means for applying a calibration weight 75 to an arm 79 that extends from the pan carrier arm 29 or from the load receiver 15, respectively, into the calibration weight housing via wall openings 81 contained therein.

Figure 7:
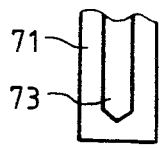
FIG. 7 is a detailed view of the slot means contained in the carrier of FIG. 2.

Referring now to FIG. 2, the calibration weight means 31 includes a housing 33 having a horizontal top wall 35 and a horizontal intermediate wall 37 that divides the housing 33 into upper and lower chambers. Mounted within the lower chamber is a horizontal calibration weight 75 having axial pins 77 that extend from opposite ends thereof. Arranged within the upper chamber of the housing 33 is a generally U-shaped calibration weight carrier member 57 having a horizontal base portion 59 contained in the upper chamber above the intermediate wall 37. Connected with opposite ends of the horizontal base portion 59 are a pair of outwardly and downwardly inclined portions 55 that terminate at their lower ends in downwardly extending leg portions 71 that extend through corresponding openings contained in intermediate wall 37 adjacent opposite ends of the calibration weight member 75. The leg portions 71 of the carrier member contain opposed vertical slots 73 that receive the pins at opposite ends of the calibration weight 75, respectively (see also FIG. 7).

Mounted for sliding movement on the upper surface of intermediate wall 37 are a pair of wedge lifting members 39 which contain threaded bores of opposite pitch, which bores receive the oppositely threaded portions 43a and 43b of a threaded spindle 41. The spindle 41 is alternately driven in opposite directions by reversible electric motor 53 having an output shaft 51 connected with spindle 41 by bevel gears 49 and 47 or by a helical gear, respectively. The upper surfaces 55 of the wedge-shaped lifting members 39 are mirror images, and correspond with the lower surfaces of the inclined portions 55 of the calibration weight carrier member 57. Thus, when the wedge members 39 are displaced apart by the oppositely threaded portions 43a and 43b of the spindle 41 when rotated in one direction, the carrier member 57 is elevated until the bottoms of the slots 73 in leg portions 71 engage the pins 71 of the calibration weight 75, thereby to raise the calibration weight relative to the arm portion 79 of the load receiving member 15, as shown in the right hand portion of FIG. 2. When the spindle 41 is rotated by motor 53 in the opposite direction, the wedge members 39 are displaced toward each other by the oppositely threaded portions 43a and 43b of the spindle 41, thereby causing the carrier member 57 to be lowered to effect corresponding lowering of the leg portions 71 with the pins 77 whereupon the calibration weight is deposited in supported relationship upon the arms 79 of the load receiving member. The calibration of the instrument may then be accomplished as is conventional in the art. As will be apparent, the calibration weight means 31 are self-contained in the housing 33, and may be installed and removed from the main housing 1 of various types of electronic weighing apparatus.

Referring to FIG. 3, it will be seen that the wedge-shaped members 39 are provided with upwardly extending guide projections 65 that extend upwardly within a longitudinally-extending guide slot 63 contained in the carrier member 57. Thus, the wedge shaped member 39 is guided during its sliding movement upon the horizontal intermediate wall 37 by the cooperation between guide projections 65 and guide slot 63.

In accordance with another feature of the invention, support means 82 containing a slot 83 are connected with a lower surface of the intermediate wall 37, whereby when the calibration weight is displaced upwardly toward its upper position relative to intermediate wall 37, the pins 77 engage corresponding slots 83 formed in the support plate 82, thereby to steady the calibration weight within the calibration housing 33.

Figure 4:
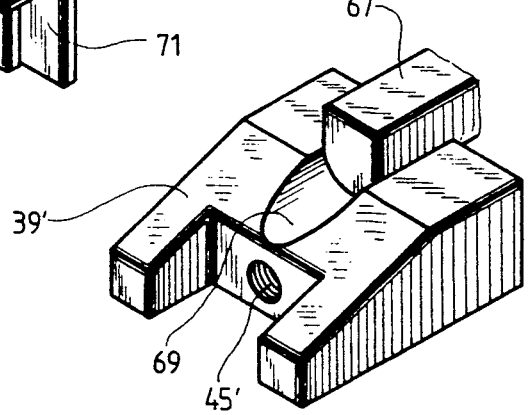
FIG. 4 is a detailed perspective view of a first modification of the wedge lifting means of FIGS. 2 and 3.
Figure 5:
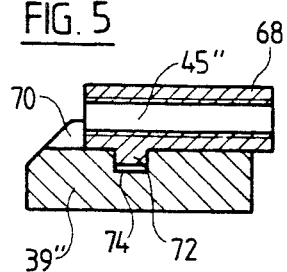
FIG. 5 is a sectional view of a second modification of the wedge lifting means.

In the modification of FIG. 4, the wedge shaped member 39' contains a guide groove 69 that receives a guide rail 67 which is connected with the carrier member, thereby to guide the wedge members 39' as they are displaced toward and away from each other by the spindle 41. In the modification of FIG. 5, the wedge shaped member 39" contains a groove 74 that receives a cam track 72 on a follower 68 having a threaded bore 45" that receives the drive spindle 41.

Figure 6:
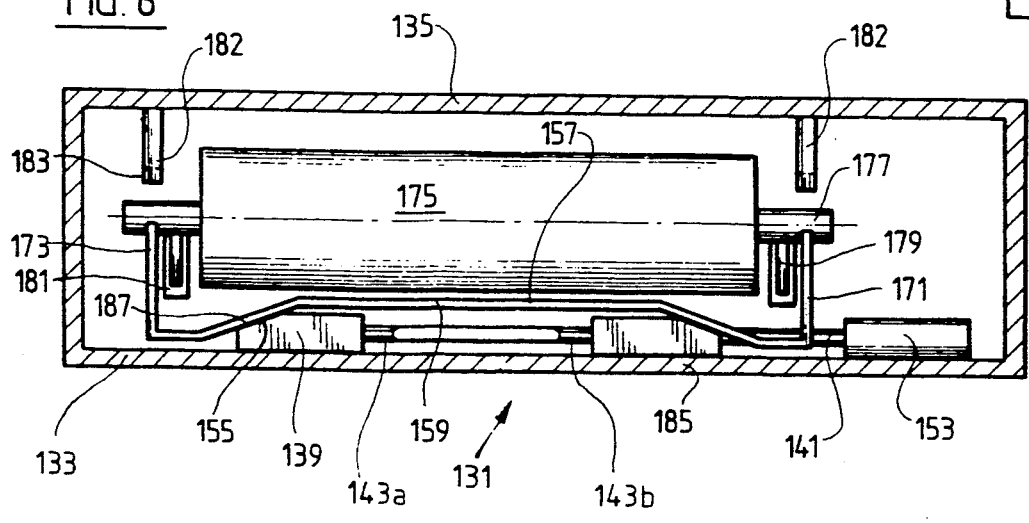
FIG. 6 is a sectional view of a modification of the calibration weight operating means.

Referring now to FIG. 6, the calibration weight means here includes a housing 133 having a horizontal bottom wall 185 upon which slide the pair of wedge shaped lifting elements 139, which have mirror image inclined surfaces 155 for engagement with the downwardly inclined intermediate portions 187 of the carrier member 157. In this embodiment, the vertical leg portions 171 extend upwardly from the lower ends of the downwardly inclined portions 187, which leg portions terminate at their upper ends in arcuate recesses 173 that receive the pin extensions 177 at opposite ends of the calibration weight 185, respectively. Thus, when the spindle 141 is rotated by motor 153 in a direction causing separation of the lifting elements 139, the carrier 157 is elevated to cause legs 171 to lift the calibration weight member 175 from the horizontal arm extensions 179 that extend into housing 133 via wall openings 181. Upon further separation of the wedge members 139, the pin extensions 177 are pressed upwardly into engagement with the central notches 183 contained in the lower ends of the fixed abutments 182, thereby to securely retain the calibration weight in the weight-removed position in the housing 133. Upon rotation of the spindle 141 in the opposite direction, the wedge lifting elements 139 are displaced toward each other (owing to the opposite pitch of the threaded portions 143a and 143b of the spindle 141), and the calibration weight is lowered until the pins 177 engage the upper surfaces of the load receiving arm extensions 179.

Thus, during transport and during normal weighing operation, the two wedge lifting elements 139 are at their position of maximum separation to retain the calibration weight in its uppermost retracted position in engagement with the stationary abutments 182.

The calibration weight housing 133 is normally fastened within the scale housing 1 or to the frame 9 by suitable screw means, or the like.

What is claimed is:
1. Electronic weighing apparatus, comprising:
   (a) a frame (9);
   (b) load receiver means (28,15) connected for movement relative to said frame;
   (c) a calibration weight (75; 175); and
   (d) calibration weight operating means connected with said frame for displacing said calibration weight between weight-applying and weight-removed positions relative to said load receiving means, respectively, said calibration weight operating means including:

(1) a weight carrier member (57,157) arranged for connection with said calibration weight; and
(2) wedge means for displacing said calibration weight between said weight-applying and weight-removed positions, said wedge means including:
   (a) a pair of axially spaced symmetrical wedge members (39,139) having opposite mirror-image inclined lifting surfaces (55,155) arranged for engagement with corresponding inclined surfaces on said carrier member, respectively; and
   (b) rotatable spindle means (41,141) for alternatively displacing said wedge members toward and away from each other, respectively, said spindle means including a pair of longitudinally spaced threaded portions of opposite pitch (43a, 43b; 143a, 143b) threadably connected in corresponding threaded bores contained in said wedge members respectively.

2. Apparatus as defined in claim 1, and further including:
   (e) a main housing (1) containing said frame; and
   (f) a calibration weight housing (33, 133) arranged within said main housing, said calibration weight being contained in said calibration weight housing.

3. Apparatus as defined in claim 2, wherein said wedge members are supported for sliding movement upon a horizontal support wall (37,185) of said calibration weight housing.

4. Apparatus as defined in claim 2, and further including stabilizing support means (82,182) engaged by said calibration weight when said weight is in said inoperable weight-removed position, and means (83,183) for centering said calibration weight relative to said stabilizing support means.

5. Apparatus as defined in claim 2, wherein the calibration housing contains openings (81, 181), said load receiver means including arm extensions (79, 179) that extend through said openings adjacent and beneath the ends of said calibration weight, respectively.

6. Apparatus as defined in claim 1, wherein said weight carrier member has a generally U-shaped configuration including a horizontal base portion (59,159), a pair of generally vertical leg portions (71,171) adjacent the ends of said base portion, respectively, and a pair of inclined intermediate connecting portions (55,155) connecting the ends of said base portion with said leg portions, respectively, said inclined portions extending downwardly and outwardly from said base portion, respectively, and having an angle of inclination corresponding with that of said wedge inclined lifting surfaces, said calibration weight being generally horizontal and extending between said carrier vertical leg portions; and further including means (73, 77; 173, 177) for connecting the ends of said calibration weight with the leg portions of said carrier member, respectively.

7. Apparatus as defined in claim 6, wherein said calibration weight engaging means on said carrier leg portions comprise V-shaped recesses (73, 173), and further wherein said calibration weight includes at each end an axial pin (77, 177) extending within the associated recess, respectively.

8. Apparatus as defined in claim 6, wherein said calibration weight engaging means on said carrier leg portions comprise arcuate recesses (73'), and further wherein said calibration weight includes at each end an axial pin (77, 177) extending within the associated recess, respectively.

9. Apparatus as defined in claim 6, wherein said carrier leg portions extend downwardly from the adjacent ends of said carrier member inclined portions, respectively, said wedge members being contained within the space defined by said carrier member.

10. Apparatus as defined in claim 6, wherein said carrier leg portions extend upwardly from the adjacent ends of said carrier member inclined portions, respectively, said wedge members being arranged externally of the space defined by said carrier member.

11. Apparatus as defined in claim 1, and further including guide means (63,65; 67,69) guiding said wedge members for longitudinal displacement relative to said carrier member.

12. Apparatus as defined in claim 11, wherein said guide means comprise guide projections (65) carried by said wedge members for cooperation with a corresponding longitudinal guide slot (63) contained in the carrier member.

13. Apparatus as defined in claim 11, wherein said guide means comprise a guide rail (67) extending longitudinally of said carrier member, said wedge members containing adjacent said carrier member guide grooves (69) receiving said guide rail.

* * * * *